United States Patent [19]

Torii et al.

[11] Patent Number: 5,127,282

[45] Date of Patent: Jul. 7, 1992

[54] BEVEL GEAR UNIT AND A WRIST MECHANISM FOR AN INDUSTRIAL ROBOT INCORPORATING THE SAME

[75] Inventors: Nobutoshi Torii, Hachioji; Hitoshi Mizuno; Kyozi Iwasaki, both of Yamanashi, all of Japan

[73] Assignee: Fanuc Ltd., Yamanashi, Japan

[21] Appl. No.: 809,046

[22] Filed: Dec. 16, 1991

Related U.S. Application Data

[63] Continuation of Ser. No. 499,546, filed as PCT/JP89/01132, Nov. 2, 1989, abandoned.

[30] Foreign Application Priority Data

Nov. 8, 1988 [JP] Japan .................. 63-280507

[51] Int. Cl.$^5$ .......................... F16H 1/20; B25J 11/00
[52] U.S. Cl. .................................. 74/417; 74/423; 74/665 M; 901/26; 901/29
[58] Field of Search .............. 901/26, 29; 74/417, 74/423, 424, 89.13, 378, 379, 665 M, 665 B; 384/551

[56] References Cited

U.S. PATENT DOCUMENTS

| | | | |
|---|---|---|---|
| 1,493,175 | 5/1924 | Wolf | 74/424 X |
| 2,241,606 | 5/1941 | Kysor | 74/424 X |
| 3,143,004 | 8/1964 | Haskin, Jr. | 74/385 X |
| 3,943,789 | 3/1976 | Mann | 74/417 |
| 4,068,536 | 1/1978 | Stackhouse | 74/417 |
| 4,594,918 | 6/1986 | Kimura et al. | 901/26 X |
| 4,807,486 | 2/1989 | Akeel et al. | 901/29 X |
| 4,823,279 | 4/1989 | Perzley et al. | 901/29 X |

FOREIGN PATENT DOCUMENTS

| | | |
|---|---|---|
| 48-29961 | 4/1973 | Japan . |
| 51-24455 | 2/1976 | Japan . |
| 56-115051 | 9/1981 | Japan . |
| 56-171193 | 12/1981 | Japan . |
| 57-68949 | 4/1982 | Japan . |

Primary Examiner—Allan D. Herrmann
Assistant Examiner—Julie Krolikowski
Attorney, Agent, or Firm—Armstrong, Nikaido, Marmelstein, Kubovcik & Murray

[57] ABSTRACT

A bevel gear unit comprising a bevel gear (11), a ball bearing ($B_1$) coaxially mounted on the shaft of the bevel gear (11) and in contact with the back surface (17) thereof, a double spacer including an inner race spacer (12) and an outer race spacer (13) and mounted on the shaft of the bevel gear (11) behind the ball bearing ($B_1$), ball bearings ($B_2$, $B_3$) mounted on the shaft of the bevel gear (11) behind the double spacer, and a bearing nut (15) screwed onto a threaded portion of the shaft of the bevel gear (11) behind the ball bearings ($B_2$, $B_3$). The axial length ($l_1$) of the inner race spacer (12) is made smaller than the axial length ($l_2$) of the outer race spacer (13) by a preloading allowance ($\delta$), and the outer race spacer (13) is provided with threaded holes ($t_1$) in the rear surface ($f_1$) thereof. When applied to a mechanism having a plurality of coaxial bevel gears, particularly, to a wrist mechanism for an industrial robot, the bevel gear unit facilitates the preloading of the bearings.

5 Claims, 6 Drawing Sheets

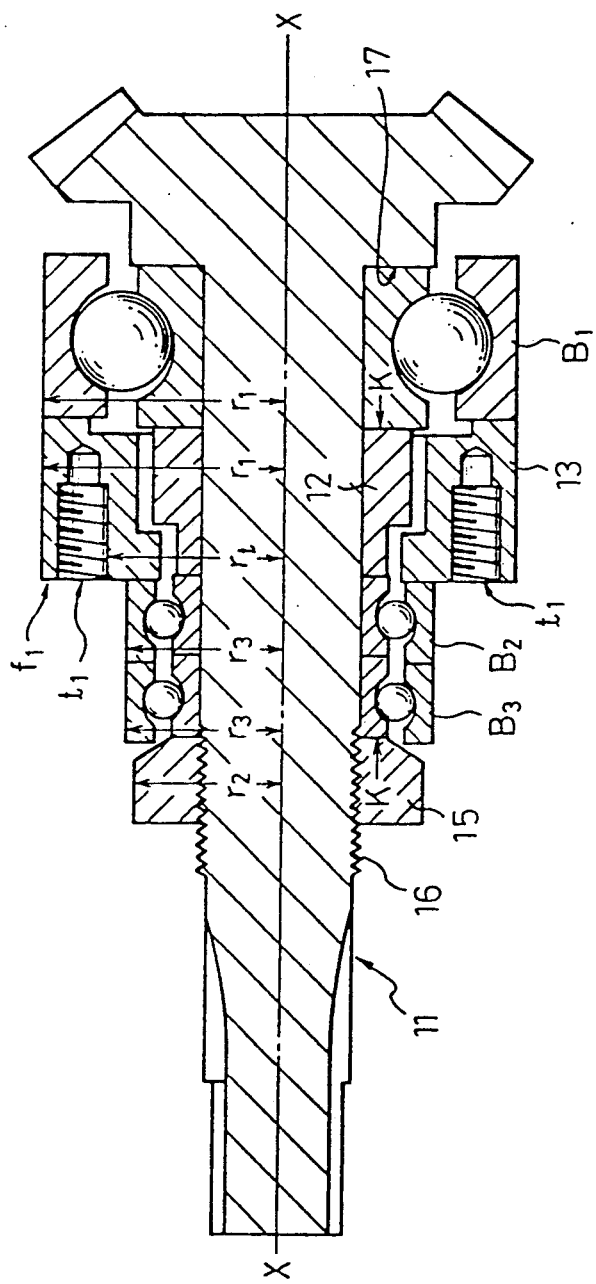

BEVEL GEAR UNIT AND A WRIST MECHANISM FOR AN INDUSTRIAL ROBOT INCORPORATING THE SAME

This application is a continuation of application Ser. No. 499,546, filed as PCT/JP89/01132, Nov. 2, 1989, now abandoned.

TECHNICAL FIELD

The present invention relates to a bevel gear unit comprising a plurality of coaxial bevel gears and facilitating preloading work and, more particularly, to such a bevel gear unit suitable for use in the wrist mechanism of an industrial robot.

BACKGROUND ART

Some current industrial robots are provided with a wrist mechanism having two coaxial bevel gears, and FIGS. 4A to 4C show an essential portion of a conventional robot wrist mechanism for an industrial robot. As shown in FIGS. 4A to 4C, a bevel gear $11'$ is attached to the extremity of a shaft A for an $\alpha$-drive, and a bevel gear $21'$ is attached to the extremity of an outer shaft $A_2$ for a $\beta$-drive.

A ball bearing $B_1$ is pressed against the back surface of the inner bevel gear $11'$, and a ball bearing $B_2$ is held in place with a bearing nut 15. A protrusion $P_0$ formed in the inner circumference of the boss of the outer bevel gear $21'$ extends between the ball bearings $B_1$ and $B_2$. A shim 19 is provided between the front shoulder of the protrusion $P_0$ and the ball bearing $B_1$.

A ball bearing $B_{21}$ is pressed against the back surface 27 of the outer bevel gear $21'$, and a ball bearing $B_{22}$ is held in place with a bearing nut 25. A protrusion P formed in a housing H extends between the ball bearings $B_{21}$ and $B_{22}$, and the bearing nut 25 engages a threaded portion 26.

When assembling the robot wrist mechanism, the ball bearings supporting the bevel gears are properly preloaded by adjusting the bearing nuts, and appropriate shims are used to adjust the tooth contact and backlash. A backlash adjustment is also necessary when the teeth of the bevel gears are abraded.

The tooth contact adjustment for the outer bevel gear of the bevel gear unit shown in FIGS. 4A to 4C of the conventional robot wrist mechanism requires a relatively easy procedure including the steps of, unfastening bolts $S_2$, pulling out an outer bevel gear assembly in the direction of the arrow $F_1$ as shown in FIG. 4B, changing the shim 29 for another shim 29, replacing the outer bevel gear assembly, and refastening the bolts $S_2$. On the other hand, the tooth contact adjustment for the inner bevel gear requires a relatively difficult procedure, as shown in FIG. 4C, including the steps of, unfastening the bolts $S_2$, removing the outer bevel gear assembly, removing the bearing nut 15, pulling out the inner bevel gear 11, in the direction of the arrow $F_2$, putting a new shim 19 on the boss of the inner bevel gear $11'$ so as to be in contact with the ball bearing $B_1$, inserting the inner bevel gear $11'$ in the outer bevel gear $21'$ so as to press the shim 19 against the ball bearing $B_1$ by the protrusion $P_0$, and fastening the bearing nut 15. Once the bearing nut 15 is thus removed, the preloading must be again performed for the ball bearings $B_1$ and $B_2$. Thus, the conventional bevel gear unit requires much and tooth contact adjustment when assembling the bevel gear unit or changing the shim.

The present invention provides a compound bevel gear unit having a new construction, to solve the foregoing problems.

DISCLOSURE OF THE INVENTION

As shown in FIGS. 1A to 3C, by way of example, an inner race spacer 12 and an outer race spacer 13 are disposed concentrically between a ball bearing $B_1$ located on the shaft of a bevel gear 11 so as to be contiguous with the back surface of the bevel gear 11, and ball bearings $B_2$ and $B_3$ to be held in place with a bearing nut 15. The length $l_1$ of the inner race spacer 12 is made smaller than the length $l_2$ of the outer race spacer 13, by a preloading allowance $\delta$, and threaded holes $t_1$ are formed in the rear surface $f_1$ of the outer race spacer 13. A double bevel gear unit is assembled by pressing an inner annular ridge $P_2$ formed in the inner circumference of an outer bevel gear 21 and provided with bolt holes $h_1$ against the rear surface $f_1$ of the outer race spacer, with a shim 19 held therebetween, and fastening the outer bevel gear 21 to the outer race spacer 13 with bolts $S_1$.

Therefore, as shown in FIG. 1B, once the bearing nut 15 is fastened, while measuring the fastening force to apply an appropriate force K to the inner races of the ball bearings $B_1$, $B_2$, and $B_3$ for preloading, the shim 19 can be changed simply by removing the bolts $S_1$ Thus the shim 19 can be changed independently of the work for preloading the ball bearings $B_1$, $B_2$ and $B_3$.

The tooth contact of the inner bevel gear can be adjusted by using an shim without affecting the preloaded ball bearings, which reduces the time and labor needed for assembling the bevel gear unit, simplifies the assembling work, and prevents a deterioration of the reliability thereof.

The present invention enables the parts maker to complete the bevel gear unit, and rationalizes the manufacturing process.

BRIEF DESCRIPTION OF THE DRAWINGS

FIG. 1B is a sectional view of the bevel gear unit after preloading;

BEST MODE OF CARRYING OUT THE INVENTION

Figure 2:
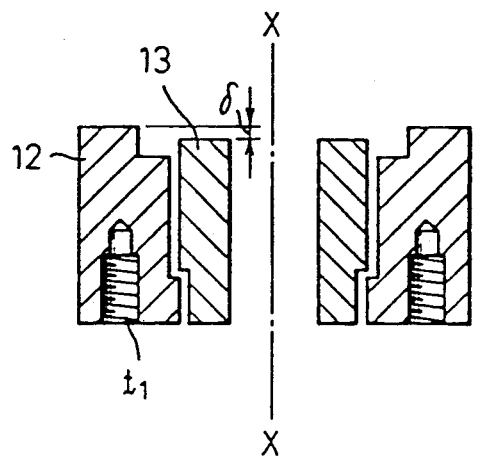
FIG. 2 is an enlarged sectional view of spacers employed by the present invention.
Figure 3A:
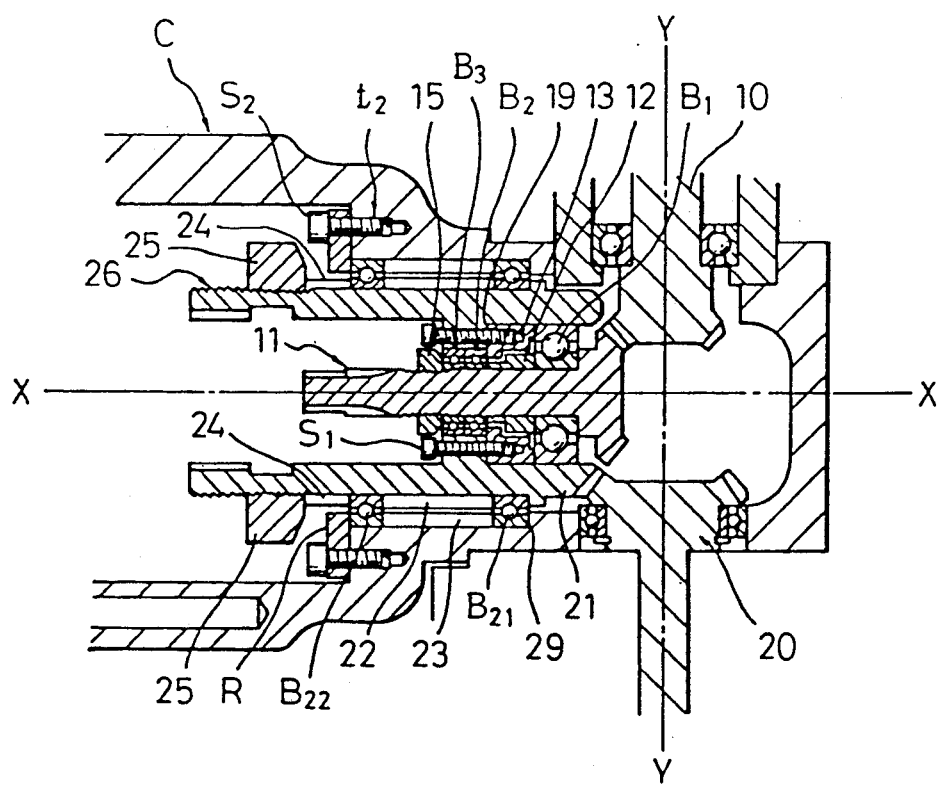
FIG. 3A is a fragmentary sectional view of a robot wrist mechanism incorporating the present invention.

The present invention is applied to a wrist mechanism for an industrial robot. FIG. 3A shows a double bevel gear unit included in the wrist mechanism, FIGS. 3B and 3C are illustrations of assistance in explaining the function of the double bevel gear unit, and FIGS. 1A, 1B and 2 are illustrations of assistance in explaining an inner bevel gear assembly.

Referring to the drawings, an inner bevel gear 11 having an axis X—X engages a bevel gear 10 having an axis Y—Y perpendicular to the axis X—X, and an outer bevel gear 21 engages a bevel gear 20 included in the wrist mechanism.

Figure 1A:
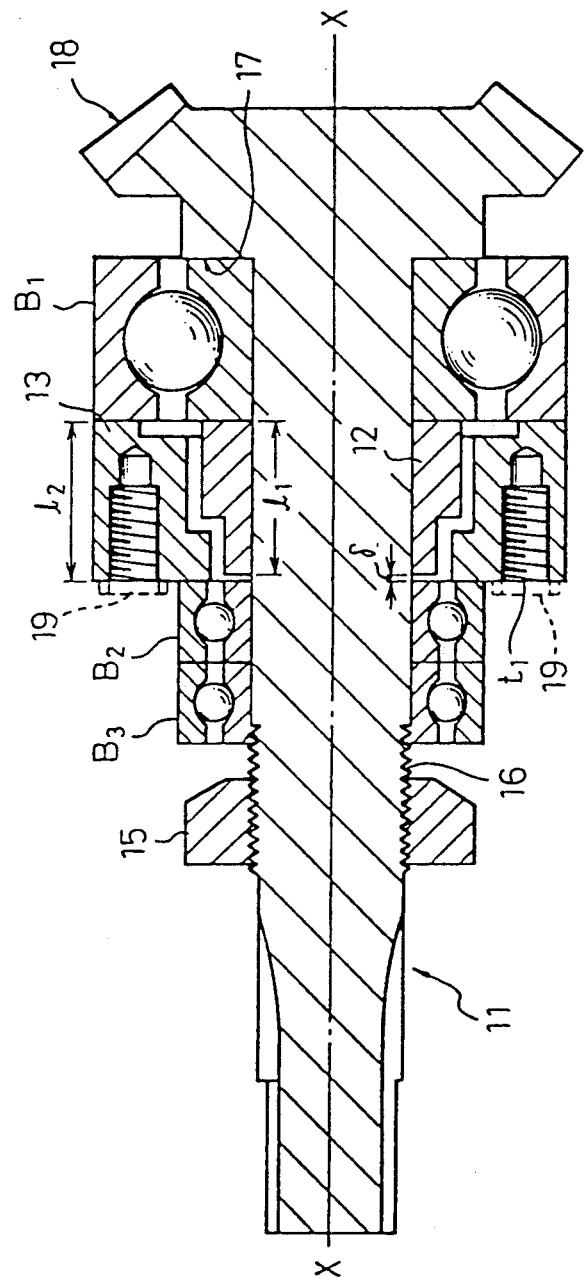
FIG. 1A is a sectional view of a bevel gear unit embodying the present invention.

As shown in FIGS. 1A and 1B, an inner bevel gear assembly comprises the inner bevel gear 11, a ball bearing $B_1$ having a radius $r_1$ located on the inner bevel gear 11 and in contact with the back surface 17 of the inner bevel gear 11, a double spacer including an inner race spacer 12 having a length $l_1$ and an outer race spacer 13 having a radius $r_1$ and a length $l_2$ and located on the inner bevel gear 11 contiguously with the ball bearing $B_1$, a ball bearing $B_2$ and $B_3$ each having a radius $r_3$ and located on the bevel gear 11 next to the double spacer, and a bearing nut 15 having a radius $r_2$ and screwed onto a threaded portion 16 of the inner bevel gear 11. Threaded holes $t_1$ are formed in the rear surface $f_1$ of the outer race spacer 13 with the axes thereof in parallel to the axis X—X of the inner bevel gear 11, so that the major diameters of the threaded holes $t_1$ are at a tangent to a circle of radius $r_t$. The length $l_2$ of the outer race spacer is made greater than the length $l_1$ of the inner race spacer by a preloading allowance $\delta$ (FIG. 2). The relationship among the radii of those components is: $r_1 > r_t > r_3 \geq r_2$.

Figure 3B:
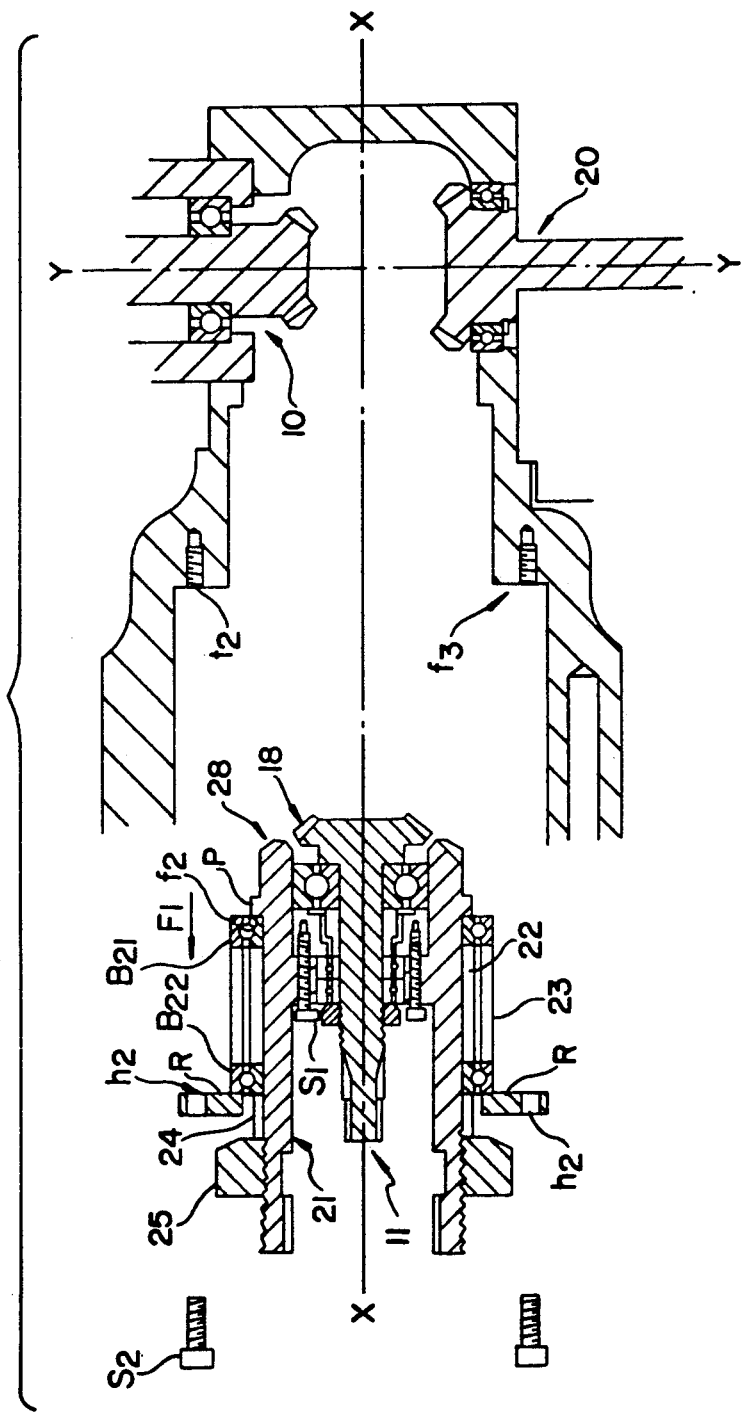
FIG. 3B is an explanatory sectional view showing a double bevel gear unit when removed from the robot wrist mechanism of FIG. 3A.
Figure 3C:
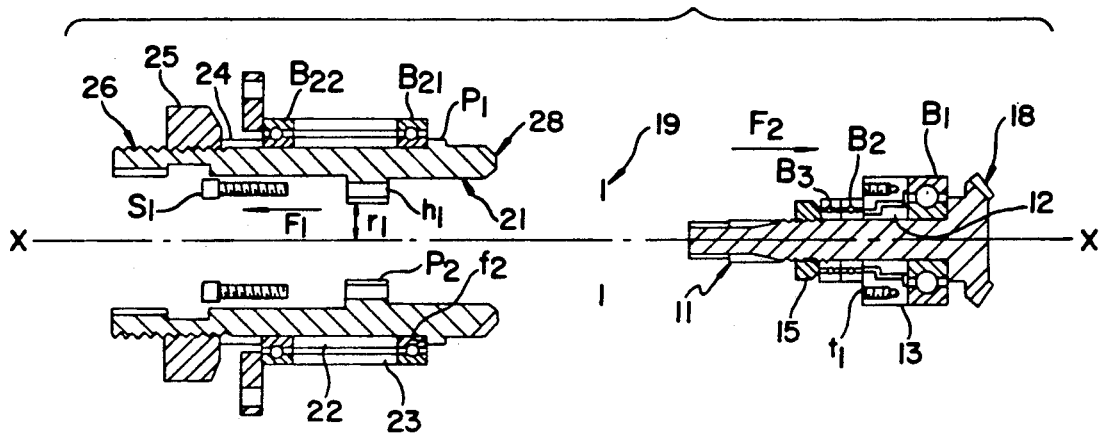
FIG. 3C is an explanatory sectional view separately showing an inner bevel gear assembly and an outer bevel gear assembly.
Figure 4A:
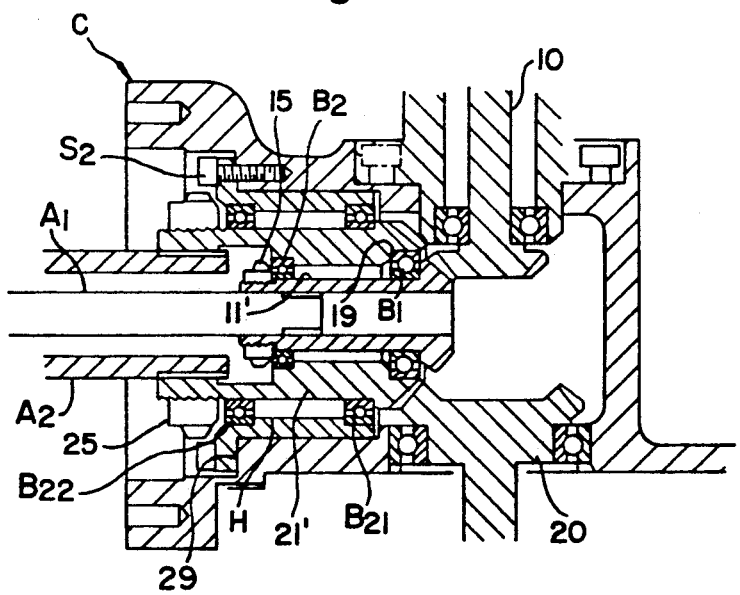
FIG. 4A is a fragmentary sectional view of a conventional robot wrist mechanism.
Figure 4B:
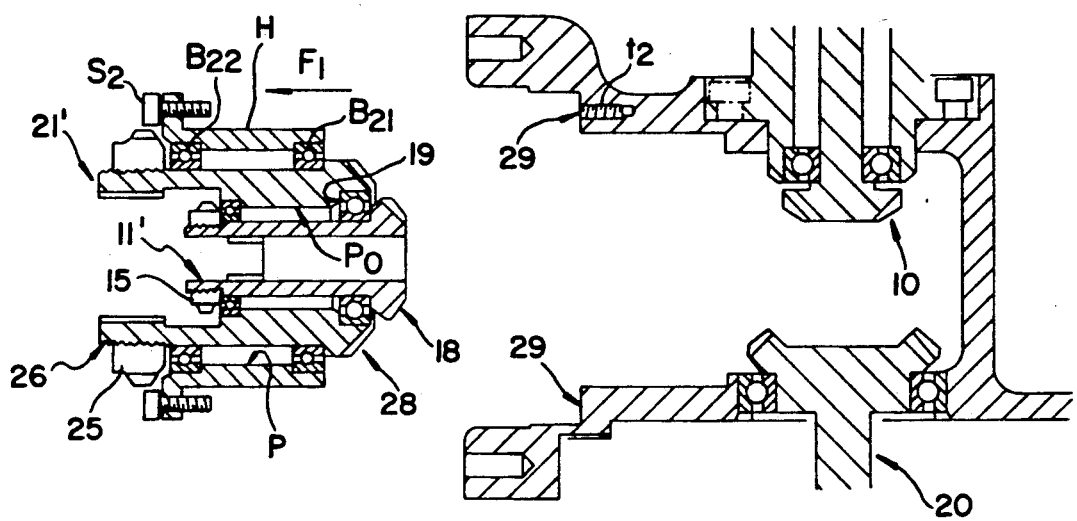
FIG. 4B is an explanatory sectional view showing a double bevel gear unit removed from the robot wrist mechanism of FIG. 4A.
Figure 4C:
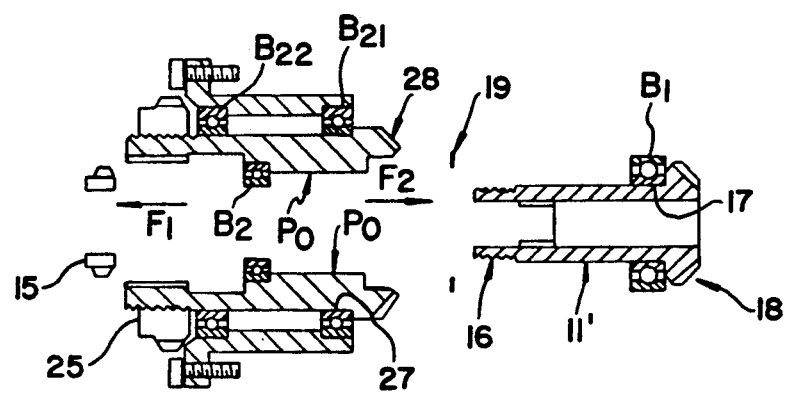
FIG. 4C is an explanatory sectional view separately showing the inner and outer bevel gear assemblies of the robot wrist mechanism of FIG. 4A.

As shown in FIGS. 3A to 3C, the outer bevel gear 21 is a tubular member provided at the front end thereof with gear teeth 28, and an outer annular ridge $P_1$ is formed on the outer circumference of the tubular body of the outer bevel gear 21 near the gear teeth 28. A ball bearing $B_{21}$ is mounted on the tubular body in contact with the rear surface $f_2$ of the outer annular protrusion $P_1$, a double spacer having a preloading allowance and including an inner race spacer 22 and an outer race spacer 23 is mounted on the tubular body and in contact with the ball bearing $B_{21}$, a ball bearing $B_{22}$ is mounted on the tubular body and in contact with the rear end of the double spacer, and a bearing nut 25 is screwed onto a threaded portion 26 of the tubular body, to fasten the inner races of the ball bearings $B_{21}$ and $B_{22}$, and the double spacer, through a collar 24, to the tubular body. An inner annular protrusion $P_2$ having an inside radius $r_1$ ($r_1 \geq r_2$) provided with bolt holes $h_1$ is formed on the inner circumference of the tubular body, and a ring R having an inside diameter greater than the outside diameter of the collar 24 and provided with bolt holes $h_2$ is provided between the ball bearing $B_{22}$ and the bearing nut 25. Threaded holes $t_2$ are formed in the inner shoulder $f_3$ of a wrist case C.

The tooth contact of the outer bevel gear 21 of the wrist mechanism is adjusted by a shim 29. The bearing nut 25 is fastened properly for the preloading adjustment of the ball bearings $B_{21}$ and $B_{22}$ by pressing the inner race of the ball bearing $B_{22}$ through the collar 24 and pressing the inner race of the ball bearing $B_{21}$ through the inner race of the ball bearing $B_{22}$ and the inner race spacer 22. Bolts $S_2$ are screwed through the ring R in the threaded holes $t_2$ of the wrist case C to fasten the ring R to the wrist case C. The outer race spacer 13 mounted on the inner bevel gear 11 is fastened to the front surface of the inner annular protrusion $P_2$ of the outer bevel gear 21 with a shim 19 held between the front surface of the inner annular protrusion $P_2$ and the rear surface $f_1$ of the outer race spacer 13 by screwing bolts $S_1$ through the bolt holes $h_1$ in the threaded holes $t_1$. The bearing nut 15 is fastened as shown in FIG. 1B to shift the respective inner races of the ball bearings $B_3$, $B_2$ and $B_1$ axially relative to the corresponding outer races for preloading, by applying an axial force K to the inner races of the ball bearings $B_3$ and $B_2$ and applying a reaction force K to the inner race of the ball bearing $B_1$ by the back surface 17 of the inner bevel gear 11.

When changing the shim 19 of the inner bevel gear assembly, the bolts $S_1$ are removed and the inner bevel gear assembly is pulled out in the direction of the arrow $F_2$ from the outer bevel gear assembly, as shown in FIG. 3C, the shim 19 is changed for another shim, and then the inner and outer bevel gear assemblies are combined again with the bolts $S_1$. Thus, the bearing nut 15 need not be moved during the changing of the shim 19, and thus the previously adjusted preloading condition of the ball bearings $B_1$, $B_2$ and $B_3$ is not changed; i.e., the shim 19 can be changed without changing the preloading condition of the inner bevel gear assembly as shown in FIG. 1B.

Although the inner bevel gear assembly in this embodiment is provided with the two ball bearings $B_2$ and $B_3$ having the same outside diameter, the inner bevel gear assembly may be provided with only a single ball bearing between the double spacer and the bearing nut. Essentially, the preloading of the ball bearing or bearings is possible provided that the inner race spacer 12 is in contact with the inner races of the ball bearings, respectively, on the opposite sides thereof, and the outer race spacer 13 is in contact with the outer races of the ball bearings, respectively, on the opposite sides thereof.

Although the present invention has been described as applied to a wrist mechanism for an industrial robot, the present invention is also applicable to mechanisms having a plurality of coaxial bevel gears, namely, a multistage bevel gear unit comprising a plurality of coaxial bevel gears associated with each other by ball bearings.

We claim:

1. A multistage bevel gear unit for an industrial robot wrist mechanism comprising;

a bevel gear;

a first ball bearing coaxially mounted on a shaft of said bevel gear and in contact with a back surface thereof;

a double space including an inner race spacer and an outer race spacer and mounted on the shaft of said bevel gear behind said first ball bearing;

at least a second ball bearing mounted on the shaft of the bevel gear behind said double spacer; and a bearing nut screwed onto a threaded portion of the shaft of the bevel gear behind said second ball bearing, wherein an axial length of the inner race spacer is made smaller than an axial length of the outer race spacer by a preloading allowance, and the outer race spacer is provided with threaded hole means for mounting an outer bevel gear in a rear surface thereof.

2. A multistage bevel gear unit in accordance with claim 1 further comprising:

the outer bevel gear coaxially receiving the bevel gear unit therein, having a tubular body internally provided with an annular protrusion provided with bolt holes, and detachably combined with the bevel gear unit by fastening the annular protrusion to the rear surface of the outer race spacer of the bevel gear unit with bolts passed through the bolt holes and screwed into the threaded hole means with a shim held therebetween.

3. A multistage bevel gear unit according to claim 2, wherein the bevel gear unit including the bevel gear can be pulled axially out of said outer bevel gear after removing the bolts.

4. A multistage bevel gear unit in accordance with claim 3, wherein the bevel gear unit is operatively connected within a wrist case.

5. A multistage bevel unit for an industrial robot wrist mechanism according to claim 1, further comprising:
a third ball bearing mounted on the shaft of said bevel gear with said second ball bearing behind said double spacer, said bearing nut being screwed into the threaded portion of the shaft of said bevel gear behind said second and third ball bearings.

* * * * *